United States Patent [19]
Hofel et al.

[11] 3,870,670
[45] Mar. 11, 1975

[54] PROCESS FOR THE MANUFACTURE OF DISPERSIONS OF THERMOSETTING REACTION PRODUCTS

[75] Inventors: Heinz-Bernhard Hofel; Hans-Joachim Kiessling, both of Hamburg; Fred Lampert, Barsbuttel; Johann Kühr, Bargteheide, all of Germany

[73] Assignee: Reichhold-Albert-Chemie Aktiengesellschaft, Hamburg, Germany

[22] Filed: June 18, 1973

[21] Appl. No.: 370,962

[30] Foreign Application Priority Data
June 21, 1972  Switzerland.......................... 9345/72
June 19, 1972  Switzerland.......................... 9197/72
May 14, 1972  Switzerland.......................... 6796/72

[52] U.S. Cl................. 260/29.3, 260/14, 260/57 R
[51] Int. Cl............................................ C08g 51/24
[58] Field of Search.................... 260/29.3, 14, 57 R

[56] References Cited
UNITED STATES PATENTS

| | | | |
|---|---|---|---|
| 1,807,545 | 5/1931 | Ostersetzer et al. | 260/57 R |
| 2,245,245 | 6/1941 | Alexander | 260/29.3 |
| 2,443,893 | 6/1948 | Collins | 260/29.3 |
| 2,736,718 | 2/1959 | Webber | 260/29.3 |
| 2,872,427 | 2/1959 | Schroeder | 260/29.3 |
| 3,459,128 | 8/1969 | Erdmann et al. | 260/14 |
| 3,719,616 | 3/1973 | Ingram | 260/29.3 |

*Primary Examiner*—Lorenzo B. Hayes
*Attorney, Agent, or Firm*—Gordon W. Hueschen

[57] ABSTRACT

Subject of the invention is a process for the manufacture of water-dilutable, aqueous dispersions, containing emulsifiers and protective colloids, of thermosetting reaction products of monohydroxybenzene compounds or mixtures of monohydroxybenzene compounds with formaldehyde in water, wherein these components are reacted with one another in water in the presence of basic nitrogen compounds, whilst warming, in a three-stage process.

5 Claims, No Drawings

PROCESS FOR THE MANUFACTURE OF DISPERSIONS OF THERMOSETTING REACTION PRODUCTS

BACKGROUND OF THE INVENTION

1. Field of the Invention

The present invention relates to a process for the manufacture of water dilutable aqueous dispersions containing emulsifiers and protective colloids, of thermosetting reaction products of monohydroxybenzene compounds or mixtures of monohydroxybenzene compounds with formaldehyde in water, these components being caused to react with one another in water in the presence of basic nitrogen compounds, whilst warming.

Numerous proposals for the manufacture of aqueous dispersions of thermosetting phenolic resins have already been described in the relevant literature. However, the proposals made hitherto have not proved successful in practice so that dispersions of thermosetting phenol-formaldehyde resol resins are not yet customary commercially available articles.

2. Prior Art

German Patent Specification No. 838,215 describes a process for the manufacture of stable, aqueous dispersions of soluble phenolic resins which is characterised in that solutions of the phenolic resins in organic solvents are dispersed in water with the aid of soap-like emulsifiers and of polyvinyl alcohol or its water-soluble derivatives.

However, these dispersions have the great disadvantage that the phenolic resin must first be taken up in an organic solvent and hence the dispersion also contains considerable amounts of organic solvents.

In using these dispersions, the organic solvents also have to be evaporated so that expensive equipment must be used in order to meet the environmental standards of industrial hygiene.

German Offenlegungsschrift No. 1,745,192 describes a process for the manufacture of aqueous emulsions of phenol-formaldehyde resol resins for impregnating fibrous substances, such as paper, in which the phenol is caused to react with an excess of formaldehyde in water in the presence of organic bases containing amino groups, and which is characterised in that the reaction between phenol and formaldehyde is carried out in an aqueous medium in which orgainc nitrogen bases with tertiary and primary and/or secondary amino groups are present, the ratio between the tertiary amino groups on the one hand and the primary and/or secondary amino groups on the other being between 1:2.5 and 1:1.5. The disadvantage of these aqueous emulsions is that they still contain ions and that therefore they cannot be used to achieve the optimum properties of the impregnated fibrous substances, due to the interfering ion content.

Furthermore, this process only yields aqueous emulsions in which the condensation between phenol and formaldehyde has not been taken to completion. This means that these emulsions still contain free phenol and/or formaldehyde which are both highly toxic so that again, when using these emulsions, special precautionary measures are necessary through the use of expensive installations for avoiding impermissible pollution of the environment.

German Offenlegungsschrift No. 1,595,038 describes a process for the manufacture of an emulsion of thermosetting low molecular reaction product of a monohydroxybenzene compound or of a mixture of monohydroxybenzene compounds and formaldehyde in water, wherein the compounds mentioned are reacted with one another in water in the presence of a basic substance, using an amide with a long carbon chain as a plasticiser, and which is characterised in that the amide used is oleylamide. These emulsions have the disadvantages already explained above since, being reaction products of low condensation, they still contain considerable proportions of free phenol and/of formaldehyde. Furthermore, the emulsified phenol-formaldehyde resin obtained according to this process is so brittle that it can only be used together with an additional plasticiser, which can result in further disadvantages due to migration of the plasticiser.

German Offenlegungsschrift No. 2,034,136 describes a phenol-aldehyde condensation product which is characterised in that it is obtained by reaction, at about 60° to 80°C, of a. one mol of a monohydric phenol with at least two hydrogen atoms which are reactive towards an aldehyde and b. at least one mol of an aldehyde of the general formula

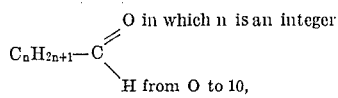

c. in the presence of a salt of a metal of the transition group of the periodic system of the elements and of a monocarboxylic acid of the general formula

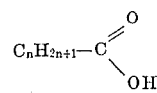

in which n is an integer from 0 to 10, and that it has a strong IR absorption at a wavelength of 1,010 cm$^{-1}$ and 1,050 cm$^{-1}$.

According to the statements on page 23, last paragraph, and page 24, paragraph 1, the phenol-aldehyde condensation product described there, liquefied by warming, can be emulsified in an aqueous solution which contains 1 percent of hydroxyethylcellulose and a non-ionic surface-active agent (= Triton X 100) as a 1 percent strength solution, using a special stirrer. As can be seen from page 13, the resin used contains zinc acetate as the ionic compound and furthermore the resin additionally contains 12 percent of volatile compounds so that this resin again suffers from the disadvantages mentioned above.

It is the aim of the present invention to improve the phenol-formaldehyde resins of conventional type, present in aqueous distribution, in various directions. As is known, the thermosetting aqueous solutions of phenol-formaldehyde resins can only be stored for a few weeks since they condense further over the course of time and hence lose their solubility in water. However, in order to be capable of storage for at least a few weeks, these solutions must necessarily still contain considerable proportions of free phenol and free formaldehyde. Some types of these phenolic resin solutions are additionally alkaline and therefore contain ions. In using these known aqueous phenol-formaldehyde resin solutions, considerable amounts of phenol and formaldehyde evaporate so that special precautionary measures must be taken to exclude impermissible pollution of the environment by these highly toxic compounds. The phenol-formaldehyde resins contained in the dispersions according to the invention are present in a stable form so that these dispersions can be stored practically indefinitely, which after setting can be converted into dispersions by simply stirring. Furthermore, the proportion of undesired volatile constituents is lower by powers of ten than in the known phenolic resin solutions. Furthermore, the phenol-formaldehyde resins contained in the dispersions manufactured according to the invention can be manufactured extremely economically since the starting substances are converted to the resin to the extent of practically 100 percent. This however also results in higher effectiveness during further use, since, in comparison to the previously known aqueos solutions, unreacted reactants are no longer present as ballast substances. Since, unlike previously, no volatile constituents are present during use and instead these constituents have been reacted to give the resin, both the economics of the manufacturing process and the economics of use are improved in an unforeseeable and abrupt manner and a considerable contribution is made to avoiding pollution of the environment.

Furthermore, the dispersions according to the invention have the great advantage that they can also entirely replace the previous phenolic resin solutions in which the phenolic resin is present dissolved in an organic solvent. The previously known phenolic resin solutions also still contain free phenol, free formaldehyde and organic solvent, which in general also has a toxic effect. Hence, considerable advantages in industrial hygiene result from the replacement of these phenolic resin solutions. However, considerable economic advantages also result since the explosion-proof processing installations and solvent recovery installations previously required are unnecessary. Furthermore, the use of the dispersions manufactured according to the invention is substantially simpler than the use of phenolic resins dissolved in the solvent, since the substrates treated with the dispersions manufactured according to the invention are in general only subjected to a physical drying process and are then in the form of finished goods or semifinished goods which can be processed further. The Japanese Displayed Specification Sho 46-27256 discloses a process for the manufacture of emulsions of phenolic resins characterized by reacting (a) phenol (10–100 parts by weight), (b) low molecular amino compounds reactive with formaldehyde or xylene (0–90 parts by weight) and (c) aldehyde or similar reacting compounds (0.3 mols relative to 1 mol of the sum of (a) and (b), reduced to aldehyde contents) in such a manner that either the components are reacted in the presence of polyvinylalcohol until a product is obtained, which is not soluble in aqueous solutions of pH below 11, and thereafter adding an emulsifier at once, or that the reaction of all components is carried on so long until a product is obtained, which is not soluble in aqueous solutions of pH below 11, and thereafter adding the emulsifier together with polyvinylalcohol at once and converting the reaction mix into a system having a pH of below 11. The Specification of this Japanese patent application discloses that phenolic resins have to be treated with the emulsifier nearly at once after finishing the reaction. Accordingly no stable emulsions are obtained by addition of the emulsifier to the resin after cooling of the reaction mix nor after heating again. An addition of emulsifier before finishing the phenolforming reaction also is not desirable, since the emulsifier reacts with the aldehydes. According to the teaching of the Japanese patent application the emulsifier may be added only after the phenolic resin has been obtained. Therefore it has been surprising that in the process of the present invention a non-ionic emulsifier is already added during the manufacture of the phenolic resin. Using the same non-ionic emulsifier no water-dilutable emulsions of the type water in resin can be obtained according to the method of the Japanese patent specification, while according to the method of the present invention always water-dilutable dispersions of the type phenolic resin-in-water are obtained. That is even the same emulsifier does not lead to water-dilutable phenolic resin dispersions, if the known method of the Japanese patent application is employed for the production. For this reason the result of the method according to the present invention is rather surprising. The advance over this known working method has been proven to the end of this specification by comparison tests.

SUMMARY

The subject of the invention is a process for the manufacture of water-dilutable, aqueous dispersions containing emulsifiers and protective colloids of thermosetting reaction products of monohydroxy benzene compounds or mixtures of monohydroxybenzene compounds with formaldehyde in water, wherein these components are reacted with one another in water in the presence of basic nitrogen compounds, whilst warming, characterized in that, in a two-stage process 1. first a mixture (A) consisting of: one or more substituted phenols, which have at least one but no more than 2 carbon atoms in the phenolic ring being reactive with formaldehyde, and phenol (which has 3 carbon atoms in the phenolic ring being reactive with formaldehyde)

or a mixture (B) consisting of: one or more substituted phenols, which have at least one but no more than 2 carbon atoms in the phenolic ring being reactive with formaldehyde, and one or more other substituted phenols having 3 carbon atoms in the phenolic ring which are reactive with formaldehyde, or a mixture (C) consisting of: one or more substituted phenols which have at least one but no more than 2 carbon atoms in the phenolic ring being reactive with formaldehyde, and phenol (which has 3 carbon atoms in the phenolic ring being reactive with formaldehyde)

and one or more other substituted phenols having 3 carbon atoms in the phenolic ring which are reactive with formaldehyde or formaldehyde donors and basic nitrogen compounds, selected from the group consisting of ammonia and/or primary or secondary amines are mixed, the mixture A, B or C being employed in such ratios that the average functionality of the sum of the phenolic compounds in the mixture A, B or C relative to formaldehyde is between 2.1 and 2.8, and the amount of formaldehyde being so chosen that the molar ratio of the total sum of added formaldehyde to the sum of the phenolic compounds in the mixture A, B or C is between 0.9 and 1.5 : 1, the basic nitrogen compound being employed in amounts of 5 to 50 mol percent relative to the total weight of phenols in the mixture A, B or C, and warmed for reaction until a sample of the condensation product withdrawn has a B-time of 6 – 15 minutes at 160°C, the batch is cooled to below 100°C and the resulting water-in-phenolic resin dispersion (of a water-in-oil type) is 2. mixed with water and protective colloid and agitated mechanically until a phase inversion of the dispersion takes place, so that a dispersion of the oil-in-water type is present, and the "phenolic resin-in-water dispersion" is further condensed, by warming, until a sample of the dispersion, when withdrawn, has a B-time of 30 seconds up to 10 minutes at 160°C, and thereafter the batch is cooled whilst stirring.

A further object of the invention is a method for the production of water-dilutable, aqueous dispersions containing emulsifiers and protective colloids of thermosetting reaction products of mixtures of monohydroxybenzene compounds and formaldehyde in water, whereby these components are made to react by heating in the presence of basic nitrogen compounds, characterized in that in a three-step process 1. first a mixture (A) consisting of: one or more substituted phenols having at least one but no more than 2 carbon atoms in the phenolic ring which are reactive with formaldehyde, and phenol (which has 3 carbon atoms in the phenolic ring being reactive with formaldehyde) is made by reacting in the first step an aralkylphenol solution in phenol produced by reacting 1 mol of phenol with 1 mol of styrene or styrene derivative in excess phenol as the solvent by heating, whereby about 2 to 5 percent by weight of oxalic acid, preferably 2.5 to 3.5 percent by weight, relative to the total amount of phenol and styrene or styrene derivative respectively, by heating in one step to about 150° to 160°C and kept at this temperature until at least 95 percent by weight of the styrene derivative employed is present in reacted form, or a mixture (B) consisting of: one or more substituted phenols having at least 1 but no more than 2 carbon atoms in the phenolic ring which are reactive with formaldehyde, and one or more other substituted phenols having 3 carbon atoms in the ring which are reactive with formaldehyde, is made by reacting in the first step an aralkylphenol solution in phenol produced by reacting 1 mol of phenol with 1 mol of styrene or styrene derivative in excess phenol as the solvent by heating, whereby about 2 to 5 percent by weight of oxalic acid, preferably 2.5 to 3.5 percent by weight, relative to the total amount of phenol and styrene or styrene derivative respectively, by heating in one step to about 150° to 160°C and kept at this temperature until at least 95 percent by weight of the styrene or styrene derivative employed is present in reacted form, or a mixture (C) consisting of: one or more substituted phenols having at least 1 but no more than 2 carbon atoms in the phenolic ring which are reactive with formaldehyde, and one or more other substituted phenols having 3 carbon atoms in the ring which are reactive with formaldehyde, and phenol (which has 3 carbon atoms in the phenolic ring being reactive with formaldehyde) is made by reacting in the first step an aralkylphenol solution in phenol produced by reacting 1 mol of phenol with 1 mol of styrene or styrene derivative in excess phenol as the solvent by heating, whereby about 2 to 5 percent by weight of oxalic acid, preferably 2.5 to 3.5 percent by weight, relative to the total amount of phenol and styrene or styrene derivative respectively, by heating in one step to about 150° to 160°C and kept at this temperature until at least 95 percent by weight of the styrene or styrene derivative employed is present in reacted form, and 2. in the second step the mixture A, B or C is reacted with formaldehyde or formaldehyde donors and basic nitrogen compounds selected from the group consisting of ammonia and/or primary or secondary amines, whereby the mixture A, B or C is employed in such amounts that the average functionality of the sum of these phenolic compounds of the mixture A, B or C to formaldehyde is between 2.1 and 2.8 and the amount of formaldehyde is so chosen that the molar ratio of the total sum of added formaldehyde to the sum of phenolic compounds in the mixture A, B or C is between 0.9 and 1.5 : 1 and wherein the basic nitrogen compound being employed in amounts of 5 to 50 mol percent, relative to the total weight of phenols in the mixture A, B or C is warmed until a sample of the condensation product withdrawn has a B-time of 6 – 15 minutes at 160°C, the batch is cooled to below 100°C and 3. in the third step the resulting water-in-phenolic resin dispersion (of a water-in-oil type) is mixed with water and protective colloid and agitated mechanically until a phase inversion of the dispersion takes place, so that a dispersion of the oil-in-water type is present, and the "phenolic resin-in-water dispersion" is condensed further by warming until a withdrawn sample of the dispersion has a B-time of 30 seconds to 10 minutes at 160°C, and the batch is subsequently cooled whilst stirring.

1. The B-time or curing time is measured similarly to the test procedure 4 described on page 174 of the book "Kunststoff-Praktikum" ("Practical Plastics") (Gaeteno D'Alelio, Carl-Hanser-Verlag/Munich 1952), wherein 0.3 of resin is stirred, at the indicated temperature, in a bowl of diameter 2 cm and maximum depth 8 mm by means of a glass rod drawn out to a point until it cures, and the time required to achieve this is measured.

By thermosetting reaction products of monohydroxybenzene compounds or mixtures of monohydroxybenzene compounds with formaldehyde there are understood resinous condensates such as are known to experts under the name resols (compare Ullmanns Enzyklopadie der techn. Chemie, Verlag Urban & Schwarzenberg, Munchen, Berlin, 1962, pages 459–467).

As basic nitrogen compounds which are present during the reaction it is possible to use: ammonia and/or primary and/or secondary, preference being given to the use of ammonia or of those amines which have a basicity equal to or greater than that of ammonia.

Suitable substituted phenols are those which contain, as substituents, alkyl radicals with 1–30 C atoms, cycloalkyl radicals with 5–10 atoms which can be of monocyclic or bicyclic structure, alkenyl radicals with 1–30 C atoms and/or cycloalkenyl radicals with 5–10 C atoms, which are again of monocyclic or bicyclic structure. Halogen-substituted phenols and aryl-substituted phenols having an aromatic ring in the substituent are also suitable.

Substituted phenols must be so chosen that they possess 1,2,3 or 4 substituents on the phenol nucleus but at least one carbon atom capable of reaction with formaldehyde must be present in the phenol ring, and that the speed of reaction of the substituted phenol with formaldehyde is 40 to 150 percent of the speed of reaction of the unsubstituted phenol (compare L.A. Cohen and W.M. Jones; *Journal of the American Chemical Society*, year 85 (1963), page 3,402. The speed of reaction can also be determined by comparative measurement of the formaldehyde consumption as a function of the reaction time in molar solutions of the phenols which contain alkali).

However, substituted phenols which contain 2 carbon atoms, capable of reacting with formaldehyde, in the phenol ring are preferred. Substituted phenols with 3 reactive positions in the phenol ring can be used individually or in minor amounts in mixtures.

The following substituted phenols can be used for the present process: m-cresol, 3,4-, 3,5- and 2,5-dimethylphenol, m-ethylphenol, m-propylphenol, m-n-butylphenol, p-tert.-butylphenol, o- and/or p-, n- and-/or iso-propenylphenol, o- and/or p-allylphenol, o-phenylphenol, p-phenylphenol, m-phenylphenol, o- and/or p- α- and/or β-phenylethylphenol individually or as mixtures, o- and/or p-α- and/or β-phenylisopropylphenol, o- and/or p-α- and/or β-methylphenylethylphenol and also technical alkylation products of olefines and phenols, of which the manufacture has been described, for example, in British Patent No. 327, 382, page 5, lines 25–34, and o- and/or p-aminophenols. Preferably p-tert.-butylphenol, o- and-/or p-α-and/or -ββ-phenylethylphenol, individually or in mixture, o- and/or p-α- and/or -β-phenylisopropylphenol, o-and/or p-α- and/or -β-methylphenylethylphenol, and ethylene/phenol substituted phenol reaction products which boil at from 230°to 260°C, and of which substituted phenol reaction product 60 to 70 percent of which dissolves in an alkaline solution, as referred to in British Patent No. 327, 382 page 5, lines 25–34.

The following are suitable as formaldehyde or formaldehyde donors: aqueous formaldehyde solutions, gaseous formaldehyde paraformaldehyde and hexamethylenetetramine. Preferably aqueous formaldehyde or paraformaldehyde are employed.

The suitable primary or secondary amines include those organic substances which contain one or more primary amino groups or one or more secondary amino groups - optionally both primary and secondary amino groups- and which are soluble in the reaction mixture and are preferably not less basic than ammonia, which means that the pK value should be ≤ 5 at 20°C. For simplicity, $NH_3$ will in the subsequent text also be included amongst the primary amines. Examples of such amines are: ammonia ($NH_3$), ethylamine, isobutylamine, tertiary butylamine, cyclohexylamine, ethanolamine, dimethylamine, diethylamine, diisopropylamine, diethanolamine, piperidine, methylpyrrolidine, morpholine, ethylenediamine, hexamethylenediamine, piperazine, diethylenetriamine, triethylenetetramine and guanidine. Preferably ammonia, dimethylamine, morpholine or diethanolamine are used. As non-ionic emulsifiers which are compatible with phenolic resin it is possible to use: addition products of ethylene oxide to alkylphenols with one or more substituents, such as are described, for example, in the publication by Farbwerke Hoechst AG, Frankfurt/m., Hoe. 2825 TH/S, of November 1962, under the title "Arkopal N-Marken" ("Arkopal N Grades"), wherein 10–35 mols of ethylene oxide are added onto the alkylphenol in the manner of a polyether, as well as ethylene oxide adducts to polypropylene glycols of various chain lengths, such as have been described in the publication by Messrs. C. H. Erbslöh, Dusseldorf, under the title "Pluronic." Furthermore, ethylene oxide addition products to natural resin acids, such as, for example, abietic acid, are suitable, such as have been described in the publication by Farbenfabriken Bayer AG, Leverkusen (Le 681(N) of January 1968) under the title "Emulsifier U."

As non-ionic agents it is furthermore possible to use polyoxyethylene alkyl ethers, polyoxyethylene alkyl esters, polyoxyethylene sorbitane monoalkyl esters, polyoxyethylene alkylamines, polyoxyethylene alkylamides, polyethyleneimines and other customary non-ionic agents. Addition products of 30 mols ethyleneoxide and p-n-nonylphenol or propylene glycol having 75–80 mol percent of ethylene oxide are preferred.

Examples of suitable protective colloids which must be added to the dispersion to increase the stability are: polyvinyl alcohol and water-soluble derivatives of polyvinyl alcohol (for example products in which about 5 percent of hydroxyl groups are acetalised, say with butyraldehyde, or in which about 10 percent of the hydroxyl groups are esterified, say with acetic acid), (compare Ullmanns Enzyklopadie der techn. Chemie, 1962, Vol. 14, pages 236–241), and cellulose ethers which are soluble in boiling water (compare Ullmanns Enzyklopadie der techn. Chemie, 1962, Vol. 5, page 171),, which can be used conjointly as a constituent. Polyvinyl alcohol being saponified for 88 mol percent and having a polymerization degree of 1,000–1,500 and hydroxy ethyl cellulose are preferred.

The dispersions manufactured according to the invention can be employed in all fields of use of conventional phenolic resisn or phenolic resin solutions and offer, in these fields, additional technical and commercial advantages through avoiding inflammable and/or toxic solvents and through the low contact of unreacted volatile starting compounds. The following may be mentioned as examples of fields of use: binders for aqueous lacquers and coating agents, binders for the manufacture of mineral wool slabs, hard papers and hard fabrics, based on cotton or glass fabrics, for decorative and electronic purposes, battery separators, air filter papers and oil filter papers for motor vehicles, abrasives such as emery paper, emery cloth and emery discs, curable moulding materials for the manufacture of cured shaped articles, such as, for example, brake linings, and binders for materials based on timber, such as plywood, chipboard and hardboard.

EXAMPLE 1

396 g of α- or β-phenylethylphenol, 188 g of phenol, 352 g of 44 percent strength by weight of aqueous formaldehyde solution, 30 g of 25 percent strength by weight ammonia water and 80 g of an 80 percent strength by weight aqueous solution of a polyethylene glycol ether of nonylphenol containing 30 mols of ethylene oxide reacted per mol of nonylphenol, are kept at the boil under reflux until the B-time is 7 minutes at 160°C. 400 g of deionised water, 30 g of a polyvinyl alcohol which is 88 mol percent saponified, and 10 g of hydroxyethyl cellulose are then added and the mixture is heated to 90°–95°C, whilst stirring, until the B-time is 4 minutes at 160°C. The mixture is then cooled to below 35°C whilst continuing to stir. A dispersion of the oil-in-water type is obtained, which is distinguished by a white colour and by the absence of coarse constituents. The viscosity is about 25,000 cP, measured at 20°C. The stability is 6 months at 20°C. If sedimentation phenomena occur, the dispersion can be stirred up without impairing the quality. It is miscible with polyvinyl acetate dispersion (homopolymer). After heat-curing at about 150°C, 99 percent resin yield is found. This means that only 1 percent by weight of resin constituents has been given off as volatile decomposition products.

Properties of a Hard Paper manufactured with this Dispersion (The manufacture of such hard papers is described, for example, in the publication by Reichhold-Albert-Chemie AG., Hamburg, of December 1969, under the title: "Durophen PP 192" and in the publication by the same company, of the same date, under the title: "Phenodur PR 271").

|  | Dispersion according to Example 1 |
| --- | --- |
| Dielectric loss factor tan δ DIN 53,483 | |
| 50 Hz | 0.021 |
| 1,000 Hz | 0.023 |
| Dielectric constant DIN 53,483 | |
| 50 Hz | 4.6 |
| 1,000 Hz | 4.5 |
| Surface resistance DIN 53,482 | $5.10^{12}$ ohm |
| plug (Volume) resistance DIN 53,482 | $10^{11}$ ohm |
| Water absorption DIN 53,475 | 28 mg at 1.5 mm layer thickness |
| Electrolytic corrosion DIN 53,489 | A/B 1.6 |
| Punching index DIN 53,488 | |
| longitudinal | — |
| transverse | 2.8 |

EXAMPLE 2

The procedure indicated in Example 1 is followed but the phenols employed are 198 g of α- or β-phenylethylphenol and 272 g of phenol.

The dispersion thus obtained shows a higher curing speed than the dispersion obtained according to Example 1.

EXAMPLE 3

The procedure followed is analogous to Example 1; however, twice the amount of 25 percent strength by weight of aqueous ammonia is employed The resulting dispersion yields stiffer laminates on curing than does a dispersion according to Example 1.

EXAMPLE 4

The procedure according to Example 1 is retained; instead of the 80 g of 80 percent by weight aqueous solution of the polyethylene glycol ether of nonylphenol, 64 g of a polyethylene glycol ester of colophony which contains 35 mols of reacted ethylene oxide per mol of colophony, are employed in the present case. This dispersion is distinguished by faster physical drying than that obtained according to Example 1.

EXAMPLE 5

The procedure indicated in Example 1 is followed; instead of the 352 g of 44 percent strength by weight aqueous formaldehyde solution, only 300 g are employed.

The dispersion thus obtained is distinguished, relative to the dispersion obtained according to Example 1, by increased flexibility of the hard papers obtained therewith.

EXAMPLE 6

The instructions of Example 1 are followed but instead of the 30 g of the polyvinyl alcohol saponified to 88 mol percent, only 20 g are used, and instead of the 10 g of hydroxyethyl cellulose 15 g are not employed. The dispersion thus obtained is distinguished by increased stability.

EXAMPLE 7

The instructions of Example 1 are followed but instead of the 188 g of phenol an equivalent amount of technical metacresol is employed. The dispersions thus obtained are distinguished by a greater curing speed.

EXAMPLE 8

The instructions of Example 1 are followed but instead of the 396 g of α- or β-phenylethylphenol an equivalent amount of α- or β-methylphenylethylphenol is employed. The dispersions thus obtained are distinguished by an increased physical drying speed.

EXAMPLE 9

The instructions in Example 1 are followed but instead of the 80 g of the 80 percent strength aqueous solution of a polyethylene glycol ether of nonylphenol which contains 30 mols of ethylene oxide per mol of nonylphenol, 64 g of a polyethylene glycol ether of a polypropylene glycol which contains 80 mol per cent of reacted polyethylene oxide are employed. The dispersion thus obtained is distinguished by increased resistance to water and lower penetration into porous substrates.

Comparison Tests to Prove the Advance over the Art (Japanese Displayed Specification Sho 46-27256 of Aug. 7, 1971)

Test 1

396 g of a technical mixture of α- and β-phenylethylphenol, 188 g of phenol, 352 g of 44 percent strength by weight aqueous formaldehyde and 30 g of 25 percent strength by weight aqueous ammonia are mixed in a flask and kept at the boil under reflux until the product is unsoluble in water of pH below 11. 500 g of deionised water, 80 g of an 80 percent strength by weight aqueous solution of a polyethylene glycolether of nonylphenol, which contains 30 mols of ethylene oxide per mol of nonylphenol, as well as 30 g of an 88 mol percent saponified polyvinyl alcohol having a polymerization degree of 1,000 are added. Then the reaction mix is cooled. The obtained dispersion of the type water-in-oil cannot be diluted any further with water. The dispersion contains a phenol contents of 9 percent by weight, relative to the weight of the dispersion.

Test 2

The instructions given in Test 1 are followed, however, the mixture is kept boiling under reflux whilst stirred until the B-time of the formed resin amounts to 6 minutes at 160°C, before addition of further water and the 88 mol percent saponified polyvinyl alcohol having a polymerization degree of 1,000 and before addition of 80 percent strength by weight aqueous solution of a polyethylene glycol ether of nonylphenol containing 30 mols ethylene oxide per mol nonylphenol.

The further steps of the method of Test 1 have been followed exactly.

The reaction product is a dispersion of the type water-in-oil being not dilutable with water and having a viscosity of over 100,000 cP.

Test 3

The instructions given in Test 1 are followed. However, instead of the 80 g of an 80 percent strength by weight aqueous solution of a polyethylene glycol ether of nonylphenol containing 30 mols of ethylene oxide per mol of nonylphenol, in this test 50 g of a 50 percent strength by weight aqueous solution of the sodium salt of the half ester of sulfuric acid and polyethylene glycol ether of nonylphenol, containing 30 mols ethyleneoxide per mol nonylphenol are added.

The obtained dispersion of the type oil-in-water can be diluted with any amounts of water. The electrolytical corrosion according to DIN 53489 of a hard (impregnated) paper made therewith, however, shows a value of A/B of 2. That means, the dispersion cannot be used for this purpose.

Test 1 and 2 demonstrate that dispersions obtained according to the known method cannot be diluted with water. According to the present invention always water-dilutable dispersions are obtained.

Test 3 shows, that it is possible to produce water-dilutable dispersions according to the known method. These dispersions, however, give products which do not have sufficient technological properties for the production of hard (impregnated) paper. The water-dilutable dispersions obtained according to the process of the present invention give such products, when employed for hard (impregnated) paper production, which correspond well to the required technological grade.

Production of a mixture of α- and β-phenylethylphenol as solution in the required amount of phenol (raw product for Examples 1, 3, 4, 5 and 6).

376 g phenol (4 mols), 208 g styrene (2 mols) and 15 g of crystalline oxalic acid are mixed and heated to 150 to 160°C, while stirred, and kept at this temperature for 2 hours. Thereafter the contents of free styrene has dropped to below 5 percent by weight, and a light-colored oily reaction product is obtained having following data:

index of refraction $n_{D20}$ : 1.5750
color number (iodine) : 2.5

Production of a mixture of α- and β-phenylethylphenol as solution in the required amount of phenol (raw product for Example 2).

376 g phenol (4 mols), 104 g styrene (1 mol) and 20 g of crystalline oxalic acid are mixed and heated to 150 to 160°C, while stirred, and kept at this temperature for 4 hours. Thereafter the contents of free styrene has dropped to below 1 percent by weight, and a light-colored oily reaction product is obtained.

Production of a mixture of α- and β-phenylethylphenol as solution in the required amount of phenol (raw product for Example 8).

376 g phenol (4 mols), 236 g technical vinyltoluene (commercial mixture of isomers) (2 mols) and 19 g of crystalline oxalic acid are mixed and heated to 150° to 160°C, while stirred, and kept at this temperature for 2 hours. Thereafter the contents of free vinyltoluene has dropped to below 5 percent by weight, and a light-colored oily reaction product is obtained.

In a special embodiment of the present invention for which arylsubstituted phenols having an aromatic ring in the substituent are employed, such components are preferred which are, dissolved in phenol or substituted phenol, produced in a novel production step. The arylsubstituted phenol is made in a dissolved state by reacting 1 mol of phenol or substituted phenol respectively, individually or in mixture, and 1 mol of styrene or styrene derivative in excess phenol or substituted phenol respectively, individually or in mixture, as the solvent, by heating in the presence of an acid as catalyzer, whereby this working method is characterized in that about 2 - 5 percent by weight of oxalic acid, preferably 2.5 - 3.5 percent by weight oxalic acid, relative to the total weight of phenol or substituted phenol respectively, and styrene or styrene derivative respectively, are employed and the mixture is heated to 150° - 160°C for so long until at least 95 percent by weight of the employed styrene or styrenederivative is present in reacted form.

The solution being such obtained has the great advantage of being rather light-colored, nearly free of by-products and is suitable for the manufacture of dispersions of the present invention directly without any washing and distilling procedures.

Examples for mixtures (A)

| Phenol | Substituted Phenol | Substituted Phenol |
|---|---|---|
| phenol 10–80 mol percent | p-tert. butylphenol 20–90 mol percent | — |
| phenol 10–80 mol percent | α-phenylethylphenol 20–90 mol percent | — |
| phenol 10–80 mol percent | p-phenylisopropylphenol 20–90 mol percent | — |
| phenol 10–80 mol percent | α-phenylethylphenol 10–50 mol percent | p-tert. butylphenol 10–40 mol percent |
| phenol 10–80 mol percent | α-phenylethylphenol 10–70 mol percent | β-phenylethylphenol 10–20 mol percent |

Examples for mixtures (B)

| Substituted phenol having 3 carbon atoms in the phenol ring being reactive with formaldehyde | Substituted phenol having 2 carbon atoms in the phenol ring being reactive with formaldehyde | Substituted phenol having 2 carbon atoms in the phenol ring being reactive with formaldehyde |
|---|---|---|
| m-cresol 10–80 mol percent | α-phenylethylphenol 20–90 mol percent | — |
| m-pentadecylphenol 10–80 mol percent | α-phenylisopropylphenol 20–90 mol percent | — |
| m-cresol 10–80 mol percent | p-isopropenylphenol 10–50 mol percent | α-phenylethylphenol 10–40 mol percent |

Examples for mixture (C)

| Phenol | Substituted phenols having 3 carbon atoms in the phenol ring which are reactive with formaldehyde | Substituted phenols having 2 | Substituted phenols having 2 |
|---|---|---|---|
| phenol 10–70 mol percent | m-cresol 10–70 mol percent | α-phenylethylphenol 20–90 mol percent | — |
| phenol 10–70 mol percent | m-cresol 10–70 mol percent | p-tert. butylphenol 20–90 mol percent | — |
| phenol 10–70 mol percent | m-pentadecylphenol 10–70 mol percent | α-phenylethylphenol 20–90 mol percent | — |
| phenol 10–70 mol percent | m-cresol 10–70 mol percent | o-cresol 10–60 mol percent | p-cresol 10–60 mol percent |

Further examples for mixtures (A), being obtained according to the oxalic acid method from the following components:

| Phenol | Styrene or styrene derivative respectively |
|---|---|
| phenol 60–90 mol percent | styrene 10–40 mol percent |
| phenol 60–90 mol percent | α-methylstyrene 10–40 mol percent |
| phenol 60–90 mol percent | technical vinyltoluene 10–40 mol percent |
| phenol 60–90 mol percent | p-bromostyrene 10–40 mol percent |

Further examples for mixtures (B), being obtained according to the oxalic acid method from the following components:

| Substituted phenol having 3 carbon atoms in the ring being reactive with formaldehyde | Styrene or styrene derivative respectively |
|---|---|
| m-cresol 60–90 mol percent | styrene 10–40 mol percent |
| m-cresol 60–90 mol percent | technical vinyltoluene 10–40 mol percent |
| m-pentadecylphenol 60–90 mol percent | styrene 10–40 mol percent |
| m-cresol and m-pentadecylphenol giving together 60–90 mol percent | styrene 10–40 mol percent |

Further examples for mixture (C) being obtained according to the oxalic acid method from the following components:

| Phenol | Substituted phenol having 3 carbon atoms in the ring which are reactive with formaldehyde | Styrene or styrene derivative |
|---|---|---|
| phenol | m-cresol (phenol and m-cresol giving together 60–90 mol percent) | styrene 10–40 mol percent |
| phenol | m-pentadecenylphenol (phenol and m-pentadecenylphenol giving together 60–90 mol percent) | styrene 10–40 mol percent |
| phenol | m-cresol (phenol and m-cresol giving together 60–90 mol percent) | α-methylstyrene 10–40 mol percent |
| phenol | 3,5-dimethylphenol (phenol and 3,5-dimethylphenol giving together 60–90 mol percent) | technical vinyltoluene 10–40 mol percent |

What is claimed is:

1. Process for manufacture of water-dilutable, aqueous dispersions containing emulsifiers and protective colloids of thermosetting reaction products of mixtures of monohydroxybenzene compounds with formaldehyde in water, wherein these components are reacted with one another in water in the presence of basic nitrogen compounds, whilst warming, characterised in that, in a two-stage process 1. in the first step: a mixture (A) consisting of: one or more substituted phenols which contain, as substituents, alkyl radicals with 1–30 C atoms, cycloalkyl radicals with 5–10 C atoms which can be of monocyclic or bicyclic structure, alkenyl radicals with 1–30 C atoms and/or cycloalkenyl radicals with 5–10 C atoms, which are again of monocyclic or bicyclic structure, halogen-substituted phenols and aryl-substituted phenols having an aromatic ring in the substituent, and which have at least one but no more than two carbon atoms in the phenolic ring being reactive with formaldehyde, with the condition that the speed of reaction of the substituted phenol with formaldehyde is 40 to 150 percent of the speed of reaction of the unsubstituted phenol, and phenol or a mixture (B) consisting of: one or more substituted phenols which contain, as substituents alkyl radicals with 1–30 C atoms, cycloalkyl radicals with 5–10 C atoms which can be of monocyclic or bicyclic structure, alkenyl radicals with 1–30 C atoms and/or cycloalkenyl radicals with 5–10 C atoms, which are again of monocyclic or bicyclic structure, halogen-substituted phenols having an aromatic ring in the substituent, and which have at least one but no more than two carbon atoms in the phenolic ring being reactive with formaldehyde, with the condition that the speed of reaction of the substituted phenol with formaldehyde is 40 to 150 percent of the speed of reaction of the unsubstituted phenol, and one or more other substituted phenols which contain, as substituents, alkyl radicals with 1–30 C atoms, cycloalkyl radicals with 5–10 C atoms which can be of monocyclic or bicyclic structure, alkenyl radicals with 1–30 C atoms and/or cycloalkenyl radicals with 5–10 C atoms, which are again of monocyclic or bicyclic structure, halogen-substituted phenols and aryl-substituted phenols having an aromatic ring in the substituent, and which have three carbon atoms in the phenolic ring which are reactive with formaldehyde, with the condition that the speed of reaction of the substituted phenol with formaldehyde is 40 to 150 percent of the speed of reaction of the unsubstituted phenol, or a mixture (C) consisting of: one or more substituted phenols which contain, as substituents, alkyl radicals with 1–30 C atoms, cycloalkyl radicals with 5–10 C atoms which can be of monocyclic or bicyclic structure, alkenyl radicals with 1–30 C atoms and/or cycloalkenyl radicals with 5–10 C atoms, which are again of monocyclic or bicyclic structure, halogen-substituted phenols and aryl-substituted phenols having an aromatic ring in the substituent, and which have at least one but no more than two carbon atoms in the phenolic ring being reactive with formaldehyde, with the condition that the speed of reaction of the substituted phenol with formaldehyde is 40 to 150 percent of the speed of reaction of the unsubstituted phenol, and phenol and one or more other substituted phenols which contain, as substituents, alkyl radicals with 1–30 C atoms, cycloalkyl radicals with 5–10 C atoms which can be of monocyclic or bicyclic structure, alkenyl radicals with 1–30 C atoms and/or cycloalkenyl radicals with 5–10 C atoms, which are again of monocyclic or bicyclic structure, halogen-substituted phenols and aryl-substituted phenols having an aromatic ring in the substituent, and which have three carbon atoms in the phenolic ring which are reactive with formaldehyde, with the condition that the speed of reaction of the substituted phenol with formaldehyde is 40 to 150 percent of the speed of reaction of the unsubstituted phenol, is mixed with formaldehyde or formaldehyde donors and basic nitrogen compounds, selected from the group consisting of ammonia and/or primary or secondary amines, the mixture A, B or C being employed in such ratios that the average functionality of the sum of the phenolic compounds in the mixture A, B or C relative to formaldehyde is between 2.1 and 2.8, and the amount of formaldehyde being so chosen that the molar ratio of the total sum of added formaldehyde to the sum of the phenolic compounds in the mixture A, B or C is between 0.9 and 1.5:1, the basic nitrogen compound being employed in amounts of 5 to 50 mol percent relative to the total weight of phenol components in the mixture A, B or C, and warmed at the boil under reflux for reaction until a sample of the condensation product withdrawn has a curing-time of 6 to 15 minutes at 160°C, the batch is cooled to below 100°C and the resulting water-in-phenolic resin dispersion of a water-in-oil type is 2. in the second step: mixed with water and protective colloid and agitated mechanically until a phase inversion of the dispersion takes place, so that a dispersion of the oil-in-water type is present, and the phenolic resin-in-water-type dispersion is further condensed, by warming, until a sample of the dispersion, when withdrawn, has a curing-time of 30 seconds up to 10 minutes at 160°C, and thereafter the batch is cooled whilst stirring.

2. Method for the production of water-dilutable, aqueous dispersions containing emulsifiers and protective colloids of thermosetting reaction products of mixtures of monohydroxybenzene compounds and formaldehyde in water, whereby these components are made to react by heating in the presence of basic nitrogen compounds, characterised in that in a three-step process 1. in the first step: a mixture (A) consisting of: one or more substituted phenols having at least one but no more than two carbon atoms in the phenolic ring which are reactive with formaldehyde, and phenol, is made by reacting 1 mol of phenol with 1 mol of styrene or styrene derivative selected from the group consisting of α-methyl styrene, vinyl toluene and p-bromo styrene in excess phenol as the solvent, whereby about 2 to 5 percent by weight of oxalic acid are employed, preferably 2.5 to 3.5 percent by weight, relative to the total amount of phenol and styrene or styrene derivative, respectively, by heating in one step to about 150 to 160°C and kept at this temperature until at least 95 percent by weight of the styrene or styrene derivative employed is present in reacted form, or a mixture (B) consisting of: one or more substituted phenols having at least one but no more than two carbon atoms in the phenolic ring which are reactive with formaldehyde, and one or more other substituted phenols having 3 carbon atoms in the ring which are reactive with formaldehyde, is made by reacting 1 mol of phenol with 1 mol of styrene or styrene derivative selected from the group consisting of $\alpha$-methyl styrene, vinyl toluene and p-bromo styrene in excess phenol as the solvent, whereby about 2 to 5 percent by weight of oxalic acid are employed, preferably 2.5 to 3.5 percent by weight, relative to the total amount of phenol and styrene or styrene derivative, respectively, by heating in one step to about 150° to 160°C and kept at this temperature until at least 95 percent by weight of the styrene or styrene derivative employed is present in reacted form, or a mixture (C) consisting of: one or more substituted phenols having at least one but no more than two carbon atoms in the phenolic ring which are reactive with formaldehyde, and one or more other substituted phenols having three carbon atoms in the ring which are reactive with formaldehyde, and phenol, is made by reacting 1 mol of phenol with 1 mol of styrene or styrene derivative selected from the group consisting of $\alpha$-methyl stryene, vinyl toluene and p-bromo styrene in excess phenol as the solvent, whereby about 2 to 5 percent by weight of oxalic acid are employed, preferably 2.5 to 3.5 percent by weight, relative to the total amount of phenol and styrene or styrene derivative, respectively, by heating in one step to about 150° to 160°C and kept at this temperature until at least 95 percent by weight of the styrene or styrene derivative employed is present in reacted form, and 2. in the second step: the mixture A, B or C is reacted with formaldehyde or formaldehyde donors and basic nitrogen compounds selected from the group consisting of ammonia and/or primary or secondary amines, whereby the mixture A, B or C is employed in such amounts that the average functionality of the sum of these phenolic compounds of the mixture A, B or C to formaldehyde is between 2.1 and 2.8 and the amount of formaldehyde is so chosen that the molar ratio of the total sum of added formaldehyde to the sum of phenolic compounds in the mixture A, B or C is between 0.9 and 1.5:1 and wherein the basic nitrogen compound being employed in amounts of 5 to 50 mol percent, relative to the total weight of phenolic compounds in the mixture A, B or C, by warming at the boil under reflux until a sample of the condensation product withdrawn has a curing-time of 6 – 15 minutes at 160°C, then the batch is cooled to below 100°C and 3. in the third step: The resulting water-in-phenolic resin dispersion of a water-in-oil type is mixed with water and protective colloid and agitated mechanically until a phase inversion of the dispersion takes place, so that a dispersion of the oil-in-water type is present, and the phenolic resin-in-water dispersion is condensed further by warming until a withdrawn sample of the dispersion has a curing-time of 30 seconds to 10 minutes at 160°C, and the batch is subsequently cooled whilst stirring.

3. Method according to claim 1 wherein as substituted phenol there is employed a member of the group consisting of p-tert-butylphenol,
o-$\alpha$-phenylethylphenol,
o-$\beta$-phenylethylphenol,
p-$\alpha$-phenylethylphenol,
p-$\beta$-phenylethylphenol, and mixtures thereof,
o-$\alpha$-phenylisopropylphenol,
o-$\beta$-phenylisopropylphenol,
p-$\alpha$-phenylisopropylphenol,
o-$\beta$-methylphenylethylphenol,
O-$\beta$-methylphenylethylphenol,
p-$\alpha$-methylphenylethylphenol,
p-$\beta$-methylphenylethylphenol, and mixtures thereof, and ethylene/phenol substituted phenol reaction products which boil at from 230° to 260°C, and of which substituted phenol reaction product 60 to 70 percent of which dissolves in an alkaline solution.

4. Dispersion produced according to the process of claim 1.

5. A water-dilutable, aqueous dispersion produced by the process of claim 2.

* * * * *

UNITED STATES PATENT OFFICE
CERTIFICATE OF CORRECTION

Patent No. 3,870,670　　　　　　　　　　Dated March 11, 1975

Inventor(s) Heinz-Bernhard Höfel, Hans-Joachim Kiessling; Fred Lampert; and Johann Kühr It is certified that error appears in the above-identified patent and that said Letters Patent are hereby corrected as shown below:

[73] Assignee: HOECHST AKTEINGESELLSCHAFT, Frankfurt, Germany
[30] "May 14, 1972 Switzerland 6796/72" -- May 14, 1973 Switzerland 6796/73--
[56] "2/1959 Webber" should be 2/1956 Webber --.
Col. 1, line 46: "orgainc" -- organic --
Col. 2, line 38 (2 occurrences): "$cm^{16^{-1}}$" -- $cm^{-1}$ --
Col. 2, line 54: "knoown" -- known --.
Col. 3, line 15: "aqeos" -- aqueous --.
Col. 6, line 58: "0.3" -- 0.3 g. --

Col. 8, line 58: "resisn" -- resins --.

Signed and Sealed this thirtieth Day of March 1976

[SEAL]

Attest:

RUTH C. MASON　　　　　　　　　　C. MARSHALL DANN
Attesting Officer　　　　　　　　Commissioner of Patents and Trademarks